(12) United States Patent
Dielacher et al.

(10) Patent No.: US 10,142,572 B2
(45) Date of Patent: Nov. 27, 2018

(54) IMAGING APPARATUS AND IMAGING METHOD FOR CAPTURING IMAGING DATA VIA A PIXEL ARRAY

(71) Applicant: Infineon Technologies AG, Neubiberg (DE)

(72) Inventors: Markus Dielacher, Graz (AT); Martin Flatscher, Graz (AT); Stefan Gansinger, Graz (AT); Michael Mark, Graz (AT); Josef Prainsack, A-Graz (AT); Hartwig Unterassinger, Graz (AT)

(73) Assignee: Infineon Technologies AG, Neubiberg (DE)

( * ) Notice: Subject to any disclaimer, the term of this patent is extended or adjusted under 35 U.S.C. 154(b) by 49 days.

(21) Appl. No.: 15/196,615

(22) Filed: Jun. 29, 2016

(65) Prior Publication Data
US 2017/0034464 A1 Feb. 2, 2017

(30) Foreign Application Priority Data

Jul. 29, 2015 (DE) .................. 10 2015 112 398

(51) Int. Cl.
| | |
|---|---|
| H04N 5/225 | (2006.01) |
| H04N 5/372 | (2011.01) |
| H04N 5/355 | (2011.01) |
| H04N 5/359 | (2011.01) |
| H04N 5/3745 | (2011.01) |
| G01S 7/486 | (2006.01) |
| G01S 7/497 | (2006.01) |

(52) U.S. Cl.
CPC .......... *H04N 5/372* (2013.01); *G01S 7/4863* (2013.01); *G01S 7/497* (2013.01); *H04N 5/359* (2013.01); *H04N 5/3559* (2013.01); *H04N 5/37452* (2013.01); *H04N 5/3745* (2013.01)

(58) Field of Classification Search
None
See application file for complete search history.

(56) References Cited

U.S. PATENT DOCUMENTS

| 8,792,087 | B2 * | 7/2014 | Spickermann | ........ G01S 7/4863 |
|---|---|---|---|---|
| | | | | 356/5.01 |
| 2006/0157643 | A1 * | 7/2006 | Bamji | ...................... G01C 3/06 |
| | | | | 250/208.1 |

(Continued)

*Primary Examiner* — Twyler L Haskins
*Assistant Examiner* — Dwight Alex C Tejano
(74) *Attorney, Agent, or Firm* — Harrity & Harrity, LLP

(57) ABSTRACT

The present disclosure relates to an imaging apparatus. The imaging apparatus comprises a pixel array. The pixel array comprises a first pixel comprising a first radiation-sensitive region and at least one associated charge storage region for collecting electrical charges from the first radiation-sensitive region. The pixel array also comprises a second pixel comprising a second radiation-sensitive region and at least one associated charge storage region for collecting electrical charges from the second radiation-sensitive region. Furthermore, the imaging apparatus comprises control circuitry configured to generate a common compensation signal being common to the first and second pixels. The common compensation signal mitigates a saturation of the respective charge storage regions of the first and second pixels.

20 Claims, 11 Drawing Sheets

(56) References Cited

U.S. PATENT DOCUMENTS

| | | | |
|---|---|---|---|
| 2007/0158533 A1* | 7/2007 | Bamji | H04N 5/335 250/208.1 |
| 2008/0079833 A1 | 4/2008 | Ichikawa et al. | |
| 2011/0058153 A1* | 3/2011 | Van Nieuwenhove | G01S 17/08 356/5.01 |
| 2013/0307968 A1 | 11/2013 | Forster | |
| 2014/0184746 A1 | 7/2014 | Kang et al. | |
| 2014/0240692 A1* | 8/2014 | Tien | G01S 17/89 356/5.01 |
| 2014/0267859 A1* | 9/2014 | Wang | H04N 5/3559 348/308 |

\* cited by examiner

IMAGING APPARATUS AND IMAGING METHOD FOR CAPTURING IMAGING DATA VIA A PIXEL ARRAY

RELATED APPLICATION

This application claims priority under 35 U.S.C. § 119 to German Patent Application No. 102015112398.3, filed on Jul. 29, 2015, the content of which is incorporated by reference herein in its entirety.

FIELD

The present disclosure relates to an imaging apparatus and an imaging method for capturing imaging data via a pixel array.

BACKGROUND

In the field of 2D or 3D imaging or 3D measurement, image sensors or cameras like for example charge-coupled device, CCD, sensors are widely used. These sensors or cameras may comprise an array of picture elements (pixels) in various numbers, which may depend on a desired resolution of an image. For example, for Time-of-Flight, ToF, cameras, a ToF pixel may also be referred to as differential pixel or Photonic Mixing Device (PMD) pixel.

A pixel typically comprises a photosensitive element emitting electrical charges in response to light shining upon the photosensitive element. However, perturbations or noise effects may occur in any given pixel, which may reduce the quality of the measured signals and therefore might need to be mitigated. Conventional pixels may comprise individual (per pixel) electronic circuits capable of measuring an electrical charge saturation effect of the pixel and providing compensation signals on a per pixel basis in order to reduce said effects. This in turn may use up large dimensions and lead to large pixel sizes, which might prevent further downscaling of a pixel array.

It may thus be desirable to provide an improved concept for reducing perturbations in pixels.

SUMMARY

An example relates to an imaging apparatus. The imaging apparatus comprises a pixel array. The pixel array comprises a first pixel comprising a first radiation-sensitive region and at least one associated charge storage region for collecting electrical charges from the first radiation-sensitive region. The pixel array also comprises a second pixel comprising a second radiation-sensitive region and at least one associated charge storage region for collecting electrical charges from the second radiation-sensitive region. Furthermore, the imaging apparatus comprises control circuitry configured to generate a common compensation signal being common to the first and second pixels. The common compensation signal mitigates or reduces a saturation of the respective charge storage regions of both the first and second pixel. Besides the (common) control circuitry delivering the common compensation signal no additional compensation circuits dedicated to individual pixels for mitigating electrical charge saturation may thus be required. In this way, an area used for a single pixel, or, in other words, a pixel size may be reduced. This may significantly simplify downsizing of a pixel array.

In some examples, the control circuitry is configured to generate a common electrical current to/from the respective charge storage regions of the first and second pixels.

In some examples, the control circuitry comprises a closed feedback loop to control the common compensation signal.

In some examples, the imaging apparatus further comprises a reference pixel. The reference pixel comprises a radiation-sensitive region, at least one associated charge storage region, and compensation circuitry. The compensation circuitry is configured to generate a reference compensation signal responsive to an electrical charge in the at least one associated charge storage region of the reference pixel or a quantity derived from said electrical charge. The reference compensation signal mitigates or reduces a saturation of the at least one charge storage region of the reference pixel. The control circuitry therein comprises distribution circuitry configured to distribute the reference compensation signal to the first and second pixels.

In some examples, the control circuitry is configured for an open-loop control of the common compensation signal based on a saturation of one or more pixels of the pixel array.

In some examples, each of the first and second pixel comprises a respective radiation-sensitive region between first and second charge storage regions associated to the respective radiation-sensitive region. Hence, the first and second pixel may be ToF pixels, respectively. Each of the first and second pixel may comprise at least two or more modulation gates between the respective first and second charge storage regions for generating a varying or variable course of electric potential between the first and second charge storage regions.

In some examples, each of the first and second pixels comprises at least one reset transistor coupled between the at least one associated charge storage region of the respective pixel and a reset potential. The control circuitry may be configured to provide the common compensation signal to the charge storage region of the respective pixel via the at least one reset transistor of the respective pixel.

In some examples, the reset potential is in a range between $0.3\ V_{DDA}$ to $0.7\ V_{DDA}$. $V_{DDA}$ denotes a supply voltage of the first and second pixels.

In some examples, the control circuitry is configured to provide the common compensation signal and a reset signal for the at least one reset transistor via a common signal line.

In some examples, the control circuitry is configured to apply the common compensation signal being common to the first and second pixels to a control terminal of the at least one reset transistor.

In some examples, the control circuitry is configured to apply the common compensation signal to the control terminal between subsequent predefined reset signals.

In some examples, the control circuitry is configured to apply a common compensation voltage being common to the first and second pixels to a gate terminal of the at least one reset transistor.

In some examples, the common compensation signal applied to the at least one reset transistor causes a common electrical compensation current being common to the first and second pixels to/from the respective charge storage regions of the first and second pixels.

In some examples, the first and the second pixel are ToF pixels, respectively.

A further example relates to a method for capturing imaging data via a pixel array. The pixel array comprises a first pixel comprising a first radiation-sensitive region and at least one associated charge storage region for collecting electrical charges from the first radiation-sensitive region. The pixel array comprises a second pixel comprising a second radiation-sensitive region and at least one associated charge storage region for collecting electrical charges from the second radiation-sensitive region. The method comprises generating a common compensation signal being common to the first and second pixels, the common compensation signal mitigating a saturation of the respective charge storage regions of the first and second pixels. This may reduce requirements for hardware, for example production efforts, costs, or building space, while still keeping the quality of measurement results at an acceptable level.

Another example relates to a ToF imaging apparatus comprising a ToF pixel array. The ToF pixel array comprises a first ToF pixel comprising a first light-sensitive semiconductor region and at least one associated charge storage region for collecting electrical charges from the first light-sensitive semiconductor region. At least a first reset transistor is coupled between the at least one associated charge storage region of the first ToF pixel and a reset potential. The ToF pixel array also comprises a second ToF pixel comprising a second light-sensitive semiconductor region and at least one associated charge storage region for collecting electrical charges from the second light-sensitive semiconductor region. At least a second reset transistor is coupled between the at least one associated charge storage region of the second ToF pixel and the reset potential. The TOF imaging apparatus further comprises control circuitry configured to generate a common compensation signal being common to the first and second ToF pixel. The common compensation signal mitigates a saturation of the respective charge storage regions of the first and second ToF pixels. The control circuitry is configured to provide the common compensation signal to the first and second light-sensitive semiconductor region of the first and second ToF pixels via the at least one first and the at least one second reset transistor. Interfering signals, for example from background illumination or thermal fluctuations, may thus be corrected for a multitude of ToF pixels using the same control circuitry. Also reset conditions may be applied globally for several ToF pixels. This may open up new possibilities to miniaturize ToF pixel arrays.

BRIEF DESCRIPTION OF THE FIGURES

Some examples of apparatuses and/or methods will be described in the following by way of example only, and with reference to the accompanying figures, in which.

DETAILED DESCRIPTION

Various example embodiments will now be described more fully with reference to the accompanying drawings in which some example embodiments are illustrated. In the figures, the thicknesses of lines, layers and/or regions may be exaggerated for clarity.

Accordingly, while further embodiments are capable of various modifications and alternative forms, some example embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of further example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art, unless expressly defined otherwise herein.

Examples of the present disclosure propose a way to suppress unwanted Direct Current (DC) components in pixels or ToF pixels caused by temperature effects or background illumination. Such DC components may lead to a saturation of pixels with respect to electrical charges emitted from optical areas of the pixels.

Figure 1:
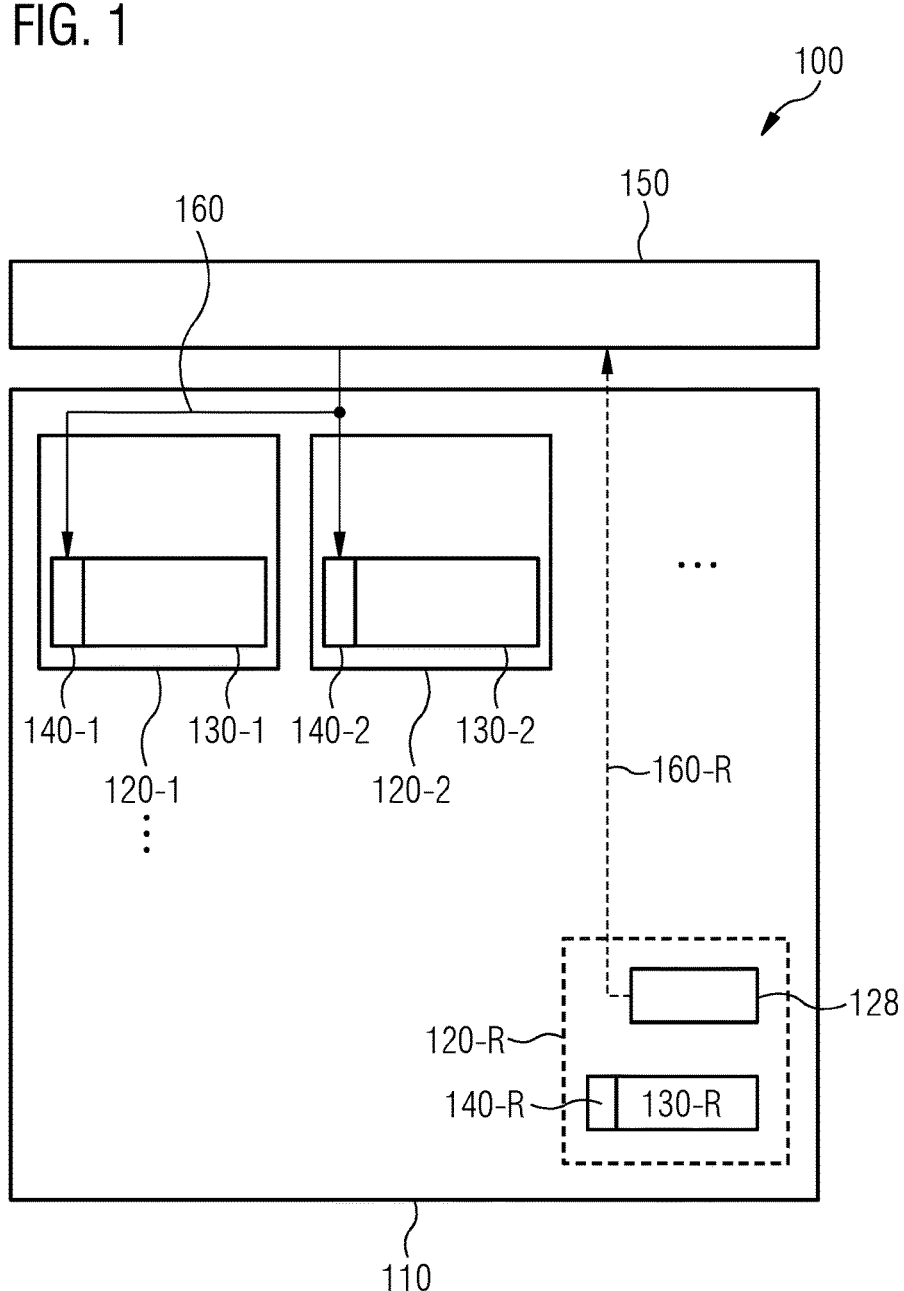
FIG. 1 shows a block diagram of an imaging apparatus according to an example.

FIG. 1 shows a schematic block diagram of an imaging apparatus 100, for example as part of a camera, according to an example.

The imaging apparatus 100 comprises a pixel array 110. The pixel array 110 comprises—among a plurality of other pixels—a first pixel 120-1 comprising a first radiation-sensitive region 130-1 and at least one associated charge storage or charge integration region 140-1 for collecting electrical charges emitted from the first radiation-sensitive region 130-1. The pixel array 110 also comprises a second pixel 120-2 comprising a second radiation-sensitive region 130-2 and at least one associated charge storage region 140-2 for collecting electrical charges emitted from the second radiation-sensitive region 130-2. Furthermore, the imaging apparatus 100 comprises control circuitry 150 configured to generate a common compensation signal 160 being common to the first and second pixels 120-1; 120-2. The common compensation signal 160 mitigates a charge saturation of the respective charge storage regions 140-1; 140-2 of the first and second pixels 120-1; 120-2. The skilled person having benefit from the present disclosure will appreciate that the pixel array 110 will typically comprise way more than the two illustrated pixels 120-1, 120-2. The first and the second pixels 120-1, 120-2 merely represent any two pixels of the pixel array 110.

When employing examples of the present disclosure, pixel-individual compensation circuits for mitigating charge saturation on a per-pixel basis may thus no longer be required, which may in turn further reduce an implementation area of a single pixel, or, in other words, pixel size. This may significantly simplify the downsizing of pixel arrays and/or increase image resolution. According to the present disclosure, a pixel-individual compensation circuit denotes a compensation circuit which is exclusively dedicated to one associated pixel. That is to say, a pixel-individual compensation circuit generates a compensation signal only for its associated pixel on an individual basis. In contrast, the control circuitry 150 according to examples generates a common and non-exclusive compensation signal 160 which may be used by a plurality of pixels. Hence, the common compensation signal is a non-individual signal commonly used a plurality of pixels to mitigate a saturation of respective charge storage regions. The term "common compensation signal" 160 may imply that copies of the same signal are provided for a plurality of pixels.

In examples, the common compensation signal 160 may be a common compensation voltage or copies of a common compensation current signal causing an equal electrical current to or from the respective charge storage regions of the first and second pixels, the equal electrical current at least reducing saturation effects.

The common compensation signal 160 may be generated in various ways.

In some examples, the control circuitry 150 may comprise a closed feedback loop to provide and control the common compensation signal 160. For closed-loop control, control circuitry 150 may use feedback to control the electrical charge saturation in the charge storage regions 140-1, 140-2. For example, the imaging apparatus 100 may further comprise one or more optional reference pixels 120-R. A reference pixel 120-R comprises a radiation-sensitive region 130-R, at least one associated charge storage region 140-R, and may comprise pixel-individual closed-loop compensation control circuitry 128. The reference pixel's closed-loop compensation control circuitry 128 may be configured to generate a reference compensation signal 160-R responsive to an electrical charge in the at least one associated charge storage region 140-R of the reference pixel 120-R or from another electrical quantity derived from said electrical charge. The reference compensation signal 160-R mitigates or reduces a saturation of the at least one charge storage region 140-R of the reference pixel 120-R. Control circuitry 150 may comprise distribution circuitry configured to distribute the reference compensation signal 160-R as common compensation signal 160 to the first and second pixels 120-1; 120-2. An example of the pixel-individual closed-loop compensation control circuitry 128, will be explained in more details with reference to FIGS. 2A and 2B.

In another example, the control circuitry 150 may be configured for an open-loop control of the common compensation signal 160. Thereby open-loop control denotes a non-feedback control. In such examples control circuitry 150 may be configured to generate the common compensation signal 160 using only the current state and a model of one or more pixels of the pixel array 110. A characteristic of an open-loop control is that it does not use feedback to determine if the saturation of the respective charge storage regions has achieved the desired goal of the common compensation signal 160. This means that the control circuitry 150 does not observe the output of the processes that it is controlling. Hence, open-loop control may in other words imply that common compensation signal 160 is received by the first or second ToF pixel 120-1; 120-2, however, no feedback signal is sent from any of the first or second ToF pixel 120-1; 120-2 to control circuitry 150. Also, reference pixel 120-R is not required. For example, common compensation signal 160 may be generated based on a manual entry by a user. Furthermore, it may be possible in other examples to perform a measurement of contrast or brightness of an image for example with a dedicated sensor arrangement, and to trigger common compensation signal 160 if contrast or brightness exceed a predetermined threshold. Furthermore, control circuitry 150 may comprise a temperature sensor unit, triggering common compensation signal 160 if a background temperature exceeds a predefined threshold, or triggering an increase in signal strength of common compensation signal 160 in relation to the background temperature. Alternatively or additionally, control circuitry 150 may comprise a light sensor unit, triggering common compensation signal 160 if a background illumination exceeds a predefined threshold, or triggering an increase in signal strength of common compensation signal 160 in relation to the background illumination.

In some examples, imaging apparatus 100 may be a 3D image sensor, camera, or any other kind of 3D measurement device using the ToF principle. In case of ToF image sensors, a pixel may be understood as a differential pixel or ToF pixel. The skilled person having benefit from the present disclosure will appreciate, however, that examples are not limited to 3D or ToF image sensors. The proposed concept of common charge saturation compensation may also be applied to pixels of 2D imaging devices for improved results. Hence, imaging apparatus 100 may, for example, be a 2D image sensor or camera, for example comprising an array of CCD pixels.

A pixel or picture element may be present in the array of pixels 110 in various numbers, which may depend on a desired resolution of an image. Each pixel 120 may comprise a photosensitive element with a radiation-sensitive region. Non-differential pixels may be used for measuring an absolute quantity related to incoming light wave packages, for example their wavelength or intensity (which may be correlated to amplitude or energy). For differential pixels (ToF pixels) the radiation-sensitive region together with adequate circuitry may be used for measuring a phase difference between an outgoing light wave and an incoming light wave which has been reflected at an object to be imaged. The photosensitive element may comprise for example a semiconductor-based photodiode which may produce an electric signal (current or voltage) from light using the photoelectric effect.

In some examples, the common compensation signal 160 may be received or provided by one or more transistors, such as reset transistors for bringing the pixels' charge storage region(s) in a predefined reset state or condition. Depending on a transistor type the common compensation signal 160 may for example be interpreted as a common compensation control signal and comprise an electric voltage provided to a control terminal or gate of a Field-Effect Transistor (FET). The transistor may then act as a voltage controlled current source. Therein, a single signal may be provided to several or all pixels, or a single signal line may be connected to several or all pixels. In other examples, common compensation signal 160 may also be provided as an electric current directly to a respective circuit node connected to the charge storage or integration regions 140-1; 140-2. Such a circuit node or the charge storage regions 140-1; 140-2 themselves may also be described as a charge integration node. The charge integration node may be positioned between a drain of a reset transistor and the charge storage region 140-1; 140-2. Therein, separate signals may be fed to each pixel, e.g. using separate signal lines, and thus enable an equal distribution of the electric current.

In the following, the principles of the present disclosure will be described in more detail with respect to examples related to ToF imaging. The skilled person having benefit from the present disclosure will appreciate however that the same principle could also be used for compensating saturation of pixels for 2D imaging applications.

Figure 2A:
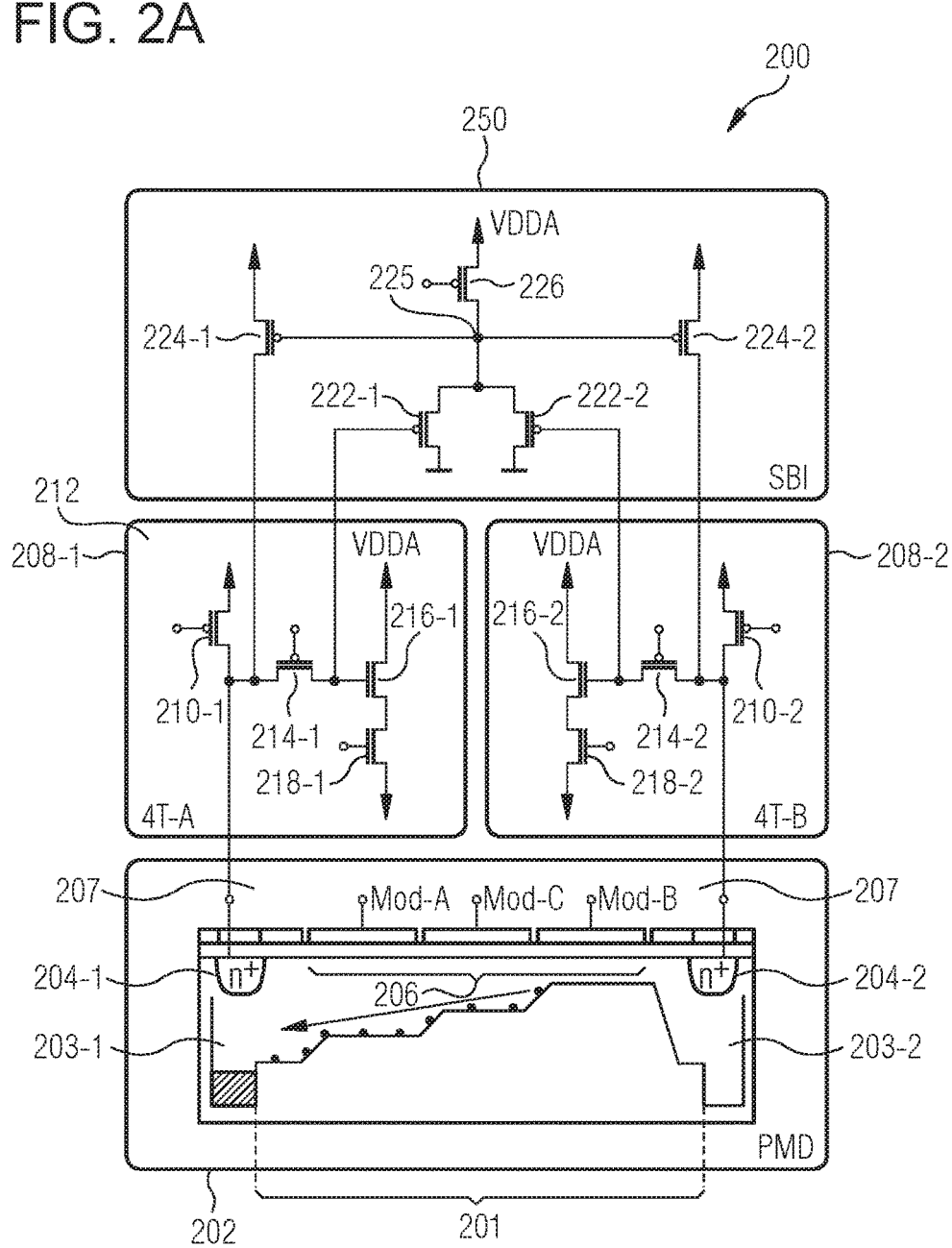
FIGS. 2A and 2B show a circuit diagram of a ToF pixel according to a conventional solution.
Figure 2B:
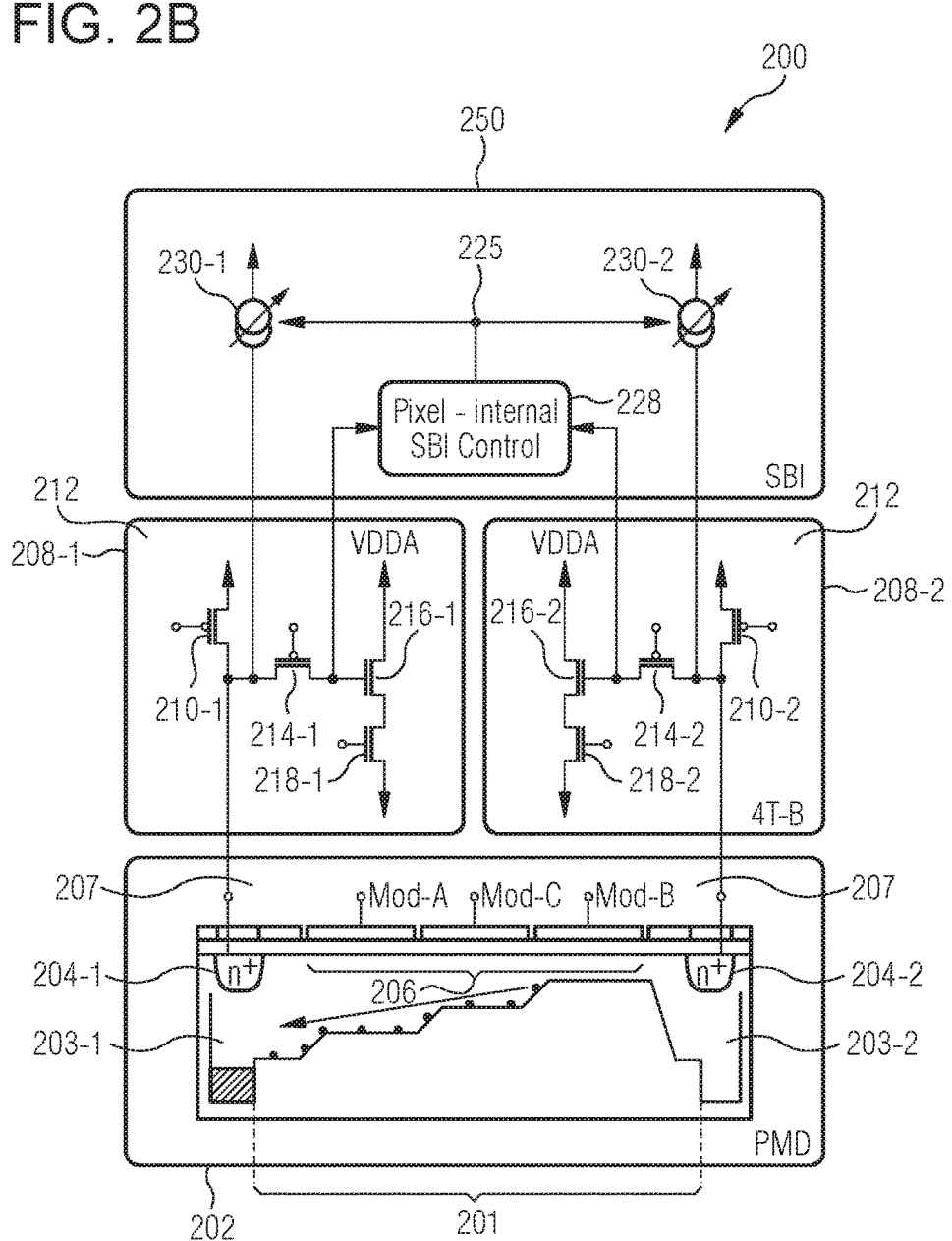

To highlight a difference between the proposed common compensation concept and per-pixel implementations, FIGS. 2A and 2B show a pixel-individual solution for saturation compensation for a ToF pixel 200. FIGS. 2A and 2B show an example of a conventional ToF or Photonic Mixing Device (PMD) pixel, wherein FIG. 2B represents of a block level drawing of pixel-internal SBI (Suppression of Background Illumination) control and FIG. 2A represents a more detailed example implementation of FIG. 2B. The unit named "SBI" may be available in each pixel of a pixel array and may contribute a significant part of the overall pixel size.

A semiconductor-based photo sensor 202 of the ToF pixel 200 comprises a radiation- or light sensitive region 201 between first and second charge storage or charge integration regions 203-1, 203-2 associated to the radiation-sensitive region 201. Terminals 204-1, 204-2 are used to connect charge storage regions 203-1, 203-2 to respective readout circuits 208-1 and 208-2 of the ToF pixel 200. Furthermore the photo sensor 202 comprises a plurality of modulation gates 206 (Mod-A, Mod-B, and Mod-C) by which an electric potential gradient may be created, channeling charge carriers from the radiation-sensitive region 201 to either the first charge storage region 203-1 or the second charge storage region 203-2. The first charge storage region 203-1 and second charge storage region 203-2 are separated from the modulation gates Mod-A, Mod-B, and, optionally, Mod-C by separation gates 207-1, 207-2, which may act as an electrical potential barrier.

Modulation gates Mod-A and Mod-B may be modulated with a rectangular function in contrary cycles, or, in other words, a function for modulation gate Mod-A is set to "high" when a function for modulation gate Mod-B is set to "low", and vice versa, thus creating a gradient in electric potential, while the optional modulation gate Mod-C may be kept at a constant potential value between the values for Mod-A and Mod-B. Assuming continuously incident light, generated charges are alternately transported to charge storage regions 203-1 and 203-2. If, for example, the modulation of gate Mod-A is in phase with the optical signal, and the modulation of gate Mod-B is anticyclical to the former, charges (e.g. electrons) may ideally be transported to the charge storage region 203-1 coupled to terminal 204-1, if the phase difference is 0°. If, accordingly, the phase difference is 180°, generated charges may be transported to the charge storage region 203-2 coupled to terminal 204-2. For any other phase difference, charges are split onto both charge storage regions 203-1 and 203-2 in according amounts. In other words, the temporally varying course of the potential may lead to a time-dependent distribution of charges to the first or second charge storage regions 203-1 or 203-2. From the difference in distribution of charges on charge storage regions 203-1 and 203-2, the distance from an irradiated object may be determined. It may be possible to use only modulation gates Mod-A and Mod-B, however, using at least three modulation gates may lead to a smoother gradient of potential.

It shall be understood in the following, that, if a transistor is described as being "coupled between a point A and a point B", the transistor's source terminal may be connected to point A, and its drain terminal may be connected to point B, or vice versa, if the transistor is a Field-Effect Transistor (FET). Accordingly, the transistor's collector terminal may be connected to point A, and its emitter terminal may be connected to point B, or vice versa, if the transistor is a bipolar transistor.

In the illustrated example implementation, each readout circuitry 208-1 and 208-2 comprises a PMOS reset transistor 210-1; 210-2 coupled between the first or second terminal 204-1, 204-2 and a predefined reset potential 212 ($V_{reset}$). PMOS reset transistor 210-1; 210-2 may serve as a switch, which may reset the respective charge storage region 203-1, 203-2 to a predefined reset condition by applying the predefined reset potential 212 to the respective charge storage region 203-1, 203-2 when activated. The term "activating" may for example imply applying a signal to a gate of a transistor, which causes the resistivity of the transistor to decrease or a current through the transistor to increase. A PMOS hold transistor 214-1, 214-2 is coupled between the first or second terminal 204-1, 204-2 and a control terminal of a NMOS read transistor 216-1, 216-2. NMOS read transistor 216-1, 216-2 is coupled between a supply potential $V_{DDA}$ and a select transistor 218-1, 218-2. PMOS hold transistors 214-1, 214-2 may apply the potential of the terminals 204-1 or 204-2 to the gate or control terminal of NMOS read transistors 216-1, 216-2 if opened, or virtually "store" the charge at the gate if closed. The amount of charge controls NMOS read transistors 216-1, 216-2. Between NMOS read transistor 216-1; 216-2 and an evaluation circuit, the NMOS select transistor 218-1, 218-2 may be activated e.g. using a predefined user pattern implied for example in a computer program for reading out a matrix of pixel values from the pixel array.

In a differential pixel, readout circuitries 208-1 and 208-2 each deliver a signal value, which is correlated to an amount of electrical charges at the respective charge storage regions 203-1; 203-2. These amounts of charges may depend on a phase difference between an outgoing light wave and an incoming (reflected) light wave. A differential signal may be provided using both the signal values from readout circuitries 208-1 and 208-2, from which the phase difference may be inferred. The phase difference may further be correlated to a distance between the camera or sensing apparatus and an imaged object. The signals delivered by readout circuitries 208-1 and 208-2 may for example be voltage values or currents.

According to the illustrated solution, there is a pixel-individual regulation feedback loop (SBI unit) 250 in each pixel 200 to compensate a photo current generated in radiation-sensitive region 201 caused by, for example, unmodulated background illumination. Also, unwanted currents generated in radiation-sensitive region 201 due to high temperatures may be compensated. The compensation of such undesired currents mitigates or reduced saturation of electrical charge storage regions 203-1, 203-2. In FIG. 2A, the electric potential at the gate of an NMOS read transistor 218-1, 218-2 is also applied to a gate of a PMOS transistor 222-1, 222-2. In other words, a drain of charges from the transistor gates or drop in potential at said gates causes the PMOS transistor 222-1, 222-2 to open and to pull down the potential at regulation node 225 coupled to a gate of a PMOS regulation transistor 224-1; 224-2 acting as compensation current source 230-1, 230-2 coupled to the charge storage regions 203-1; 203-2. The electric potential at regulation node 225 and/or the current generated by regulation transistor 224-1; 224-2 may be regarded as compensation signals mitigating a saturation of the respective charge storage regions 203-1, 203-2 of the ToF pixel 200-1, 200-2.

Between regulation node 225 and the supply potential $V_{DDA}$, a further PMOS transistor 226 for adjustment of the supply voltage may be arranged, so that in principle the further PMOS transistor 226 and the PMOS transistor 222-1, 222-2 may act as a voltage divider. The PMOS regulation transistor 224-1, 224-2 is coupled between the reset potential 212 and terminal 204-1, 204-2 and acts a current source for compensating undesired charge accumulation and, hence, saturation effects in charge storage regions 203-1, 203-2.

The person having benefit from the present disclosure will appreciate that the circuit implementation of FIG. 2A is only one example out of many. In particular, the per-pixel saturation compensation feedback loop may be implemented in various ways. Therefore FIG. 2B illustrates or more abstract depiction of the per-pixel saturation compensation feedback loop 250-2.

In the illustrated examples of FIGS. 2A and 2B, pixel-internal SBI control block 228 is implemented on a per-pixel basis. In reaction to a change in potential at the gate of the NMOS read transistor 216-1, 216-2, a feedback signal may be provided to a current source 230-1, 230-2 between reset potential and terminal 204-1, 204-2. The current source 230-1, 230-2 may be implemented using regulation transistor 224-1, 224-2.

Following the conventional individual per-pixel saturation compensation approach of FIGS. 2A and 2B, however, the circuit area required in each pixel might be too large to allow a further pixel shrink, for instance below a value of 17.5 μm×17.5 μm. For that purpose, examples propose to apply a non-individual charge saturation compensation.

Figure 3A:
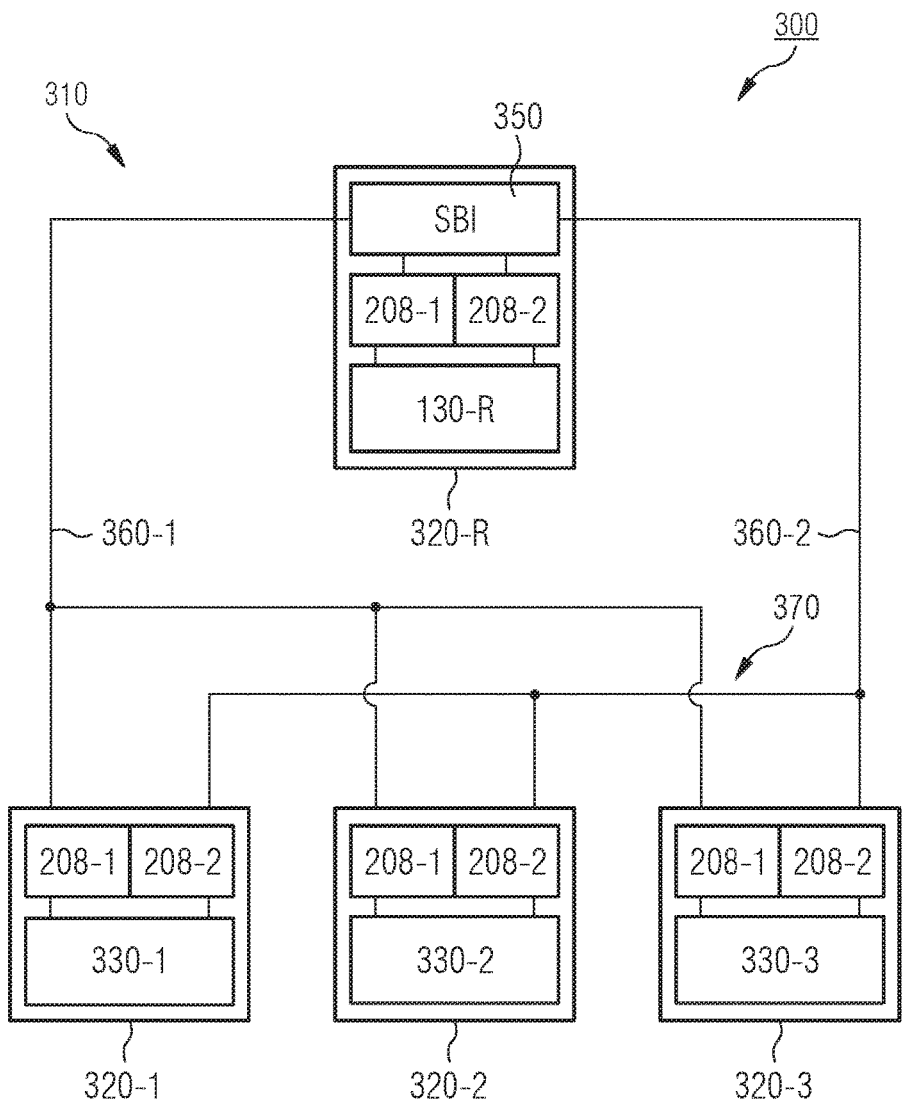
FIG. 3A shows a block diagram of a closed-loop ToF imaging apparatus according to an example.

FIG. 3A shows a block diagram of an example of a ToF sensing apparatus 300 implementing a closed feedback loop to provide and control a common charge compensation signal 360.

ToF sensing apparatus 300 comprises an array 310 of a plurality of ToF pixels 320. Each ToF pixel 320 includes a semiconductor-based optical area 330 and readout circuitry 208-1, 208-2. At least one of the ToF pixels 320 acts as reference pixel 320-R and differs from the other ToF pixels 320-1, 320-2, 320-3 in that it additionally comprises a pixel-internal SBI control circuit 350. An example of the pixel-internal SBI control circuit 350 of reference ToF pixel 320-R has just been explained with reference to FIGS. 2A and 2B. The pixel-internal saturation compensation signal(s) generated by SBI control circuit 350 of reference ToF pixel 320-R may be used as global common saturation compensation signal(s) 360 for the other pixels 320-1, 320-2, 320-3 of the pixel array 310. Here, a first common saturation compensation signal 360-1 may, for example, be dedicated to compensation of first charge storage regions, while a second common saturation compensation signal 360-2 may, for example, be dedicated to compensation of second charge storage regions. In the illustrated example, the SBI control circuit 350 of reference ToF pixel 320-R may act as common control circuitry configured to generate the common compensation signal 360 being common to the other ToF pixels 320-1, 320-2, 320-3 not having own SBI control circuitry. Distribution circuitry 370 may be configured to distribute the reference compensation signal(s) 360 to the ToF pixels 320-1, 320-2, 320-3.

Figure 3B:
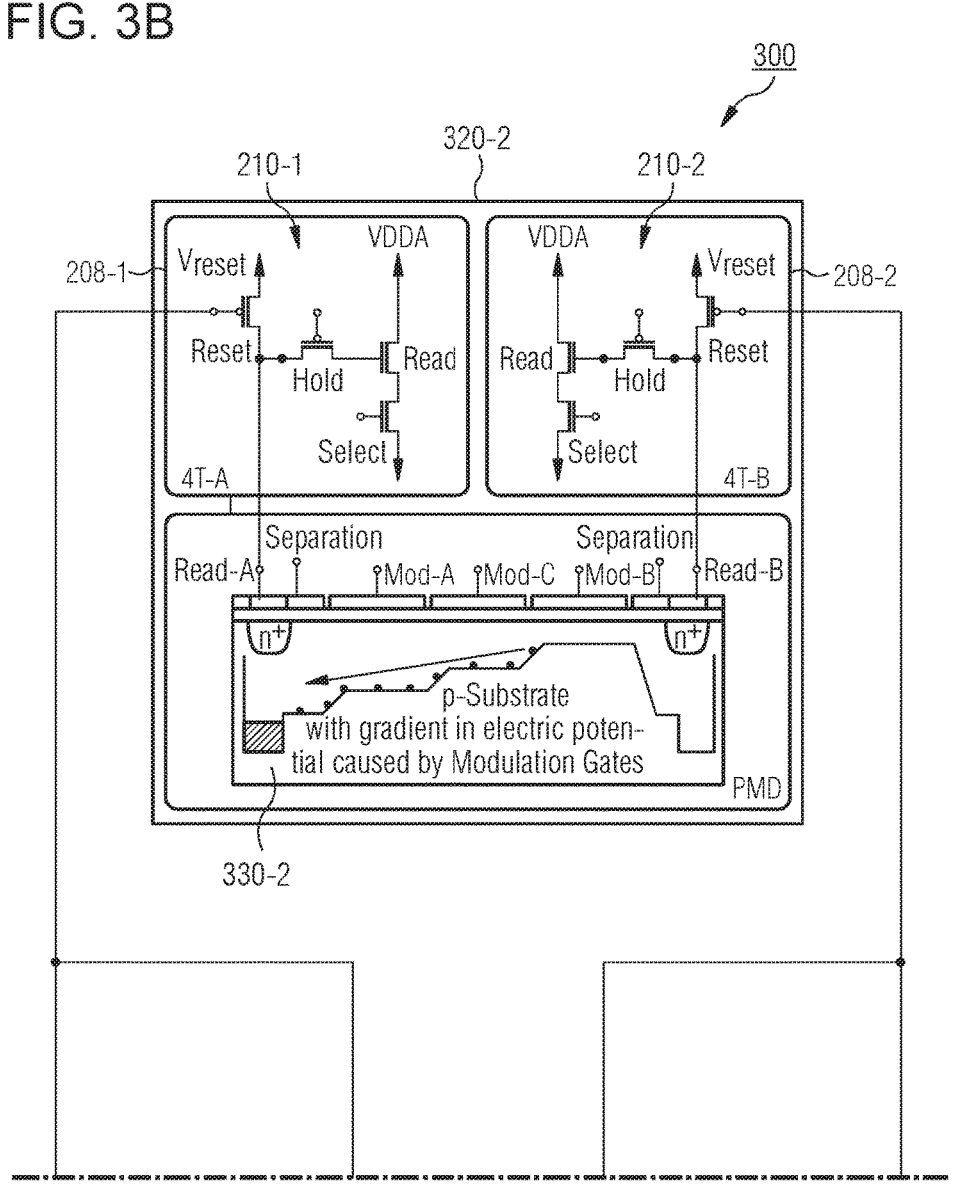
FIGS. 3B-3D show an example implementation of the ToF imaging apparatus of FIG. 3A.
Figure 3C:
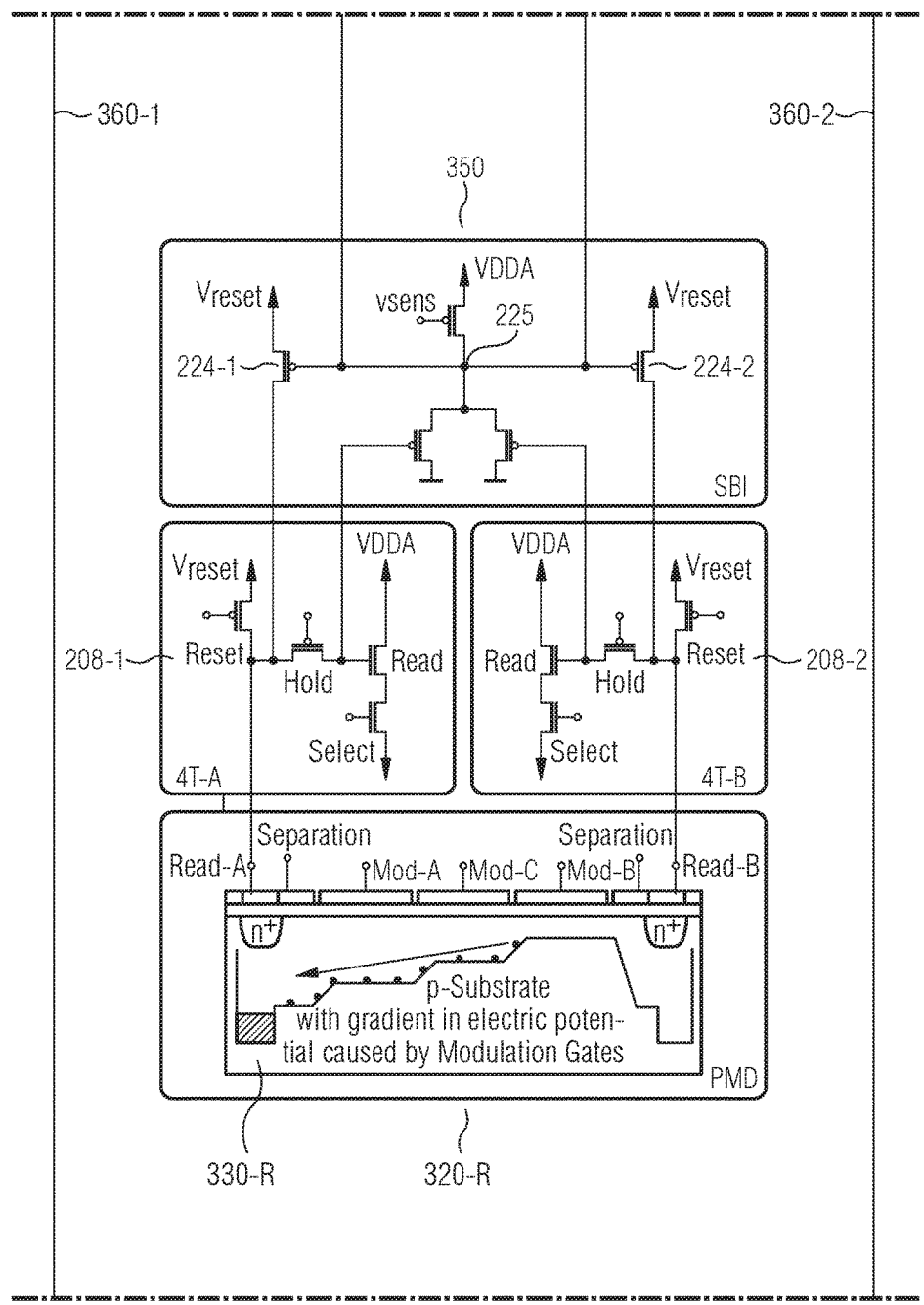
Figure 3D:
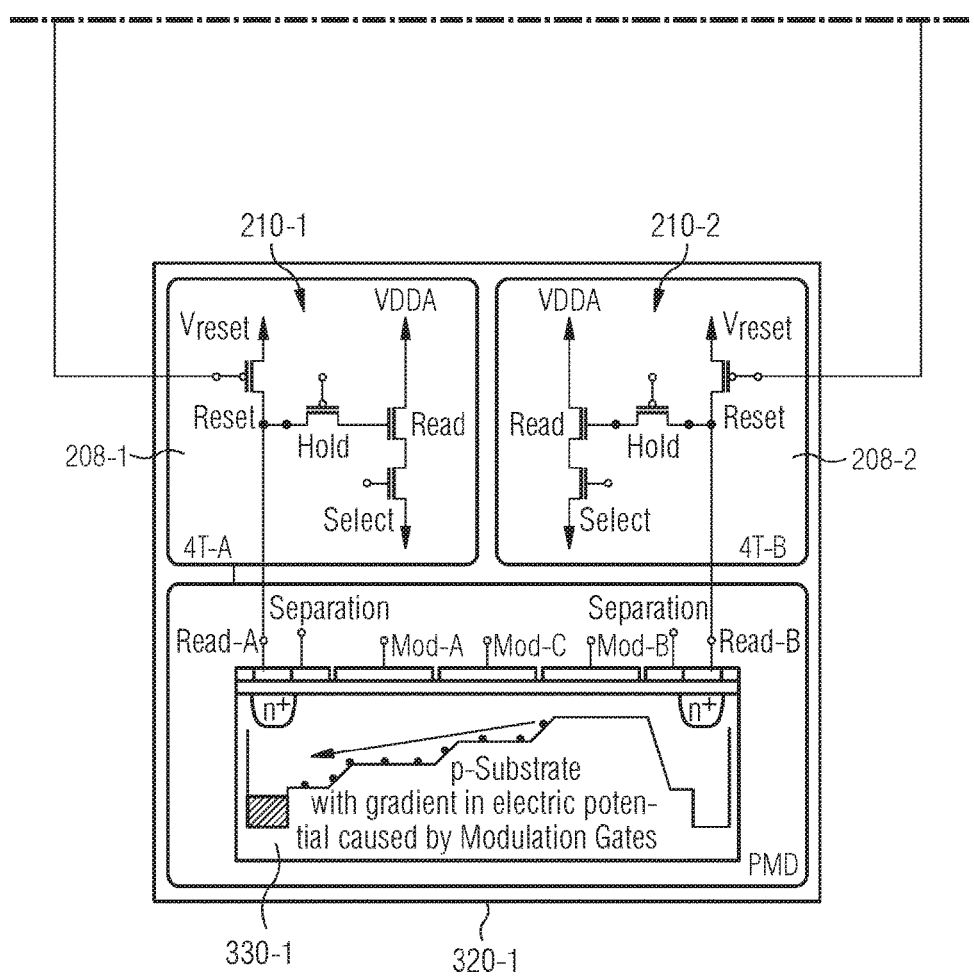

FIGS. 3B-3D show a more detailed implementation example of the concept described with reference to FIG. 3A.

Here, the reference ToF pixel 320-R substantially corresponds to pixel 200 of FIG. 2A. ToF pixels 320-1 and 320-2 partly correspond to reference ToF pixel 320-R except that they are not equipped with respective own SBI control circuits 350. In the example of FIGS. 3B-3D, regulation node 225 of the pixel-internal SBI control circuit 350 of reference ToF pixel 320-R is coupled to the gates of PMOS reset transistors 210-1; 210-2 thereby acting as compensation current source—similar to PMOS regulation transistors 224-1, 224-2 of pixel-internal SBI control circuit 350. The person skilled in the art will appreciate that regulation transistors 224-1, 224-2 could also well be omitted if regulation node 225 was directly coupled to the gates of PMOS reset transistors of reference ToF pixel 320-R. In this way further significant circuit area could be saved.

Figure 4A:
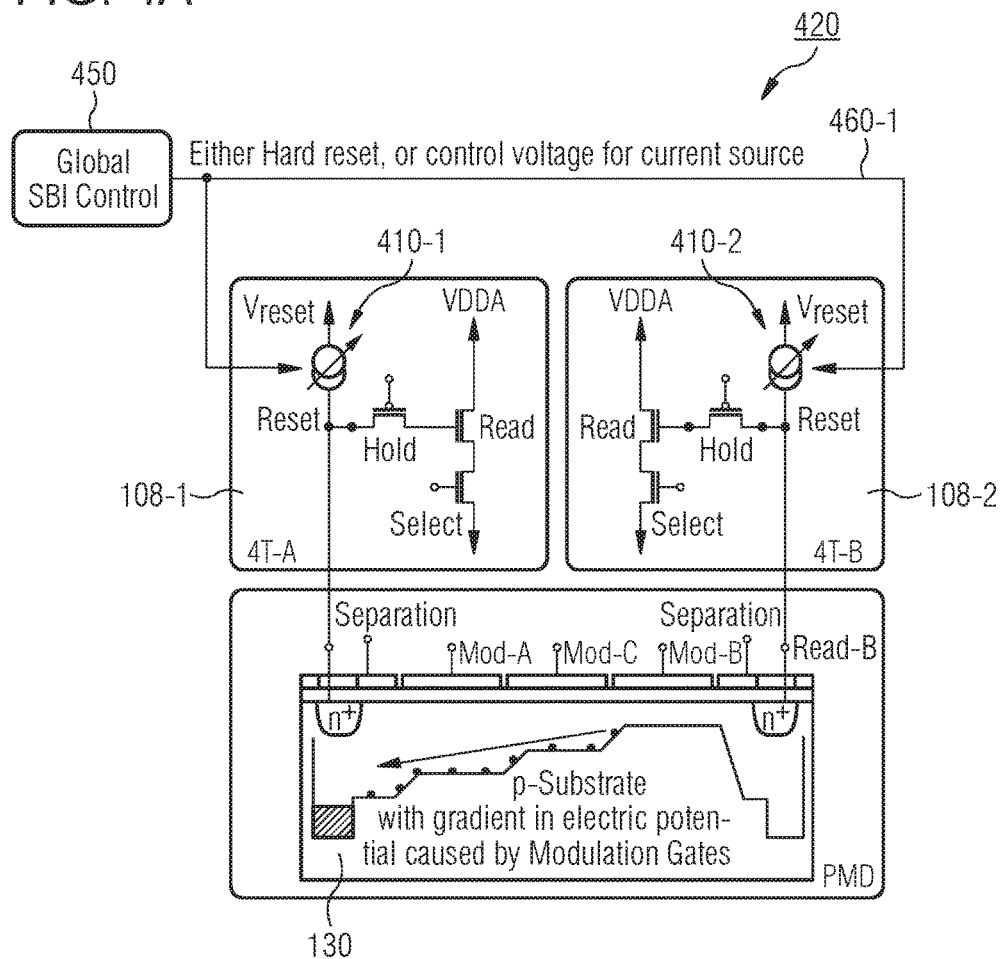
FIG. 4A shows a circuit diagram of a ToF pixel with global SBI control according to an example.
Figure 4B:
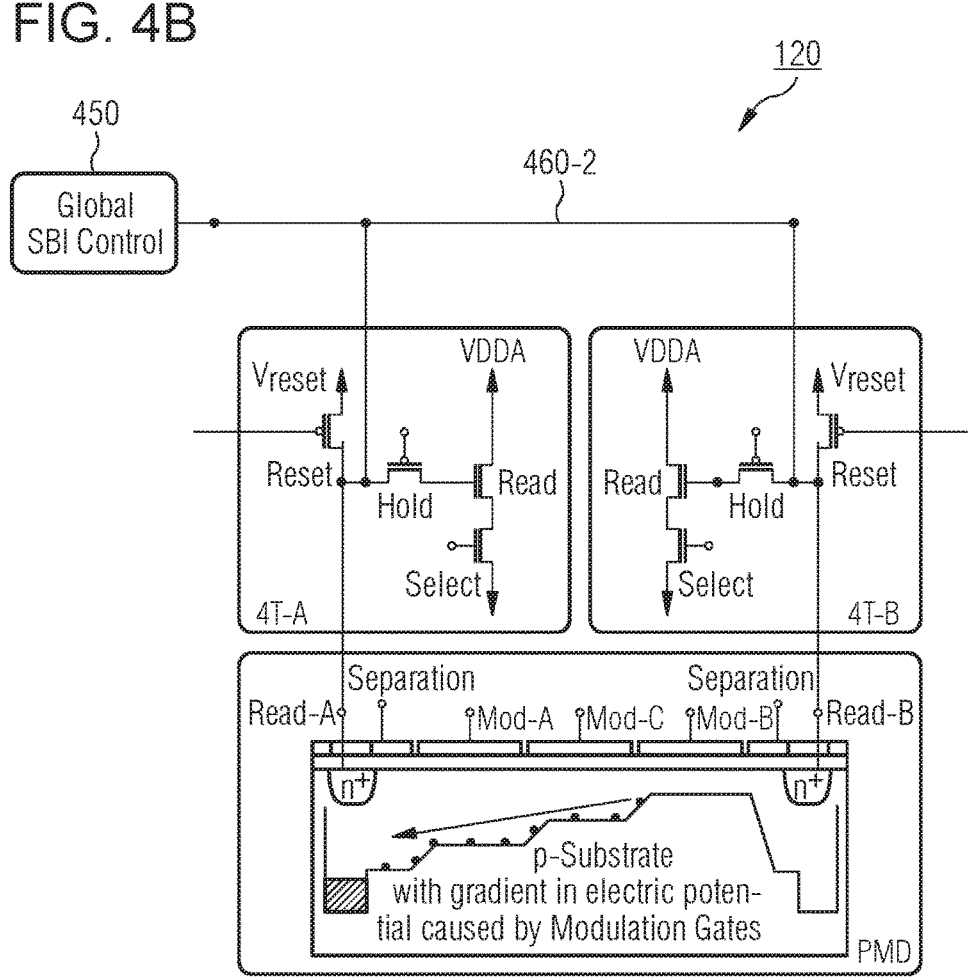
FIG. 4B shows a circuit diagram of a ToF pixel with global SBI control according to a further example.

FIGS. 4A and 4B summarize an aspect of the present disclosure illustrating a single ToF pixel 420 which is coupled to a global SBI control unit 450. Here, "global" may be understood as a SBI unit common to all or at least a plurality of ToF pixels 420 of a ToF pixel array. Compared to the pixels of FIGS. 2A and 2B there is no "SBI" block in each of the pixels 420. So the regulation of the compensation current is not done for each pixel individually. Instead, the compensation current is controlled by global SBI control unit 450 which can be located outside the pixel array, and which defines the same compensation current for all of the pixels.

In the illustrated example of FIG. 4A, reset transistors linked between a reset potential $V_{reset}$ and terminals Read-A or Read-B may at the same time be used as compensation current source 410-1, 410-2, respectively. The global SBI control unit 450 provides a common compensation control signal, or, in other words, a common compensation voltage 460-1 to the control terminals (e.g. gates) of the reset transistors. Thereby the common compensation voltage 460-1 as well as a common predefined reset voltage for the reset transistors may be applied via a common signal line. The global SBI control unit 450 may be configured to apply the common compensation voltage 460-1 to the control terminal between subsequent predefined reset signals. Hence, in some examples, it is proposed to use the reset transistors of each pixel 420 as current sources, so any use of dedicated transistors only as switches or the individual regulation in each pixel might be avoided.

In an alternative example illustrated in FIG. 4B, the global SBI control unit 450 may directly provide a common compensation signal, or, in other words, a common compensation current 460-2 to the terminals Read-A or Read-B of a pixel 420. Here, global SBI control unit 450 would require a common current source commonly used for a plurality of pixels.

Furthermore, setting the reset-voltage $V_{reset}$ of the pixel too close to $V_{DDA}$ might be problematic, as the potential may then vary only into one direction, which will be explained more closely later in the following. Some examples thus involve setting the reset voltage in or around the center of the output range. For example, in some examples the reset potential is in a range between $0.3V_{DDA}$ to $0.7V_{DDA}$, wherein $V_{DDA}$ denotes a supply voltage of the first and second ToF pixels 120-1; 120-2. In another example the value may also be between 0.1 and 0.9 $V_{DDA}$. In other words, the value may be chosen such that the potential of the charge storage regions 140-1 and/or 140-2 may increase or decrease. In this way, the voltage in the charge integration node may go down if the photo current is higher than the compensation current or up if the photo current is lower than the compensation current.

Figure 5A:
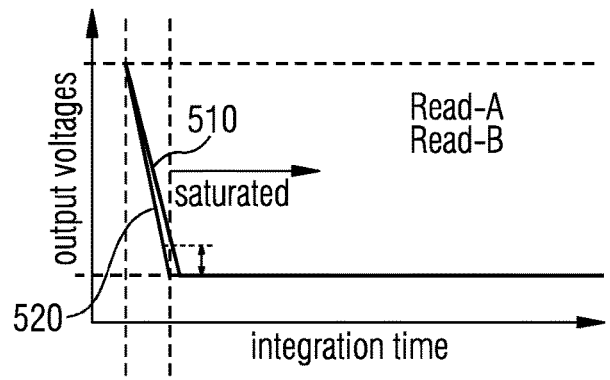
FIGS. 5A-5D show temporal courses of signals at a first and a second charge storage region of a Time-of-flight, ToF, pixel according to an example.

Turning now to FIGS. 5A, 5B, 5C, and 5D, a few output signal scenarios are shown. Changes or differences in electric potentials, which are denoted here as differential pixel output voltages at terminals Read-A 510 and Read-B 520, are plotted against integration time. These charge storage regions may again correspond to those in FIGS. 1, 3A-3D, and 4A-4B, as shown above. A point-in-time $t^1$ marks a beginning of charge integration or charge accumulation in consequence to incident light signals. FIG. 5A shows a scenario in which no compensation current is used. In this case both signals 510 and 520 may saturate quite quickly at a point-in-time $t_2$, in which case a differential signal available between terminals Read-A and Read-B may not be significant enough for an accurate result.

Figure 5B:
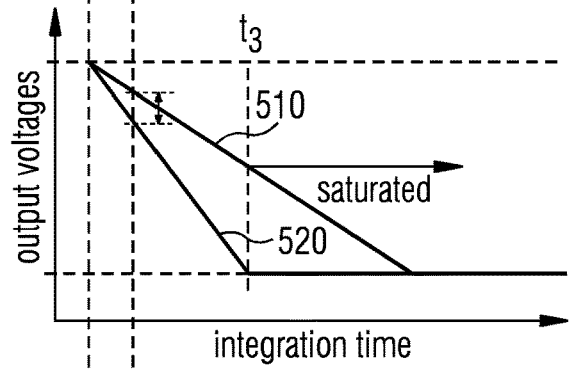

FIG. 5B shows how a well-balanced compensation current could increase the dynamic range of the pixel. The controlled current may be in good relation to background illumination. For example, currents from background illumination may be compensated by at least 90 percent in a time interval $t_2$-$t_1$. This may cause saturation to take effect at a later point-in-time $t_3>t_2$, or, in other words, extend a time interval between the beginning of charge integration and the occurrence of saturation effect for example by a factor of at least 3, or 10, etc.

Figure 5C:
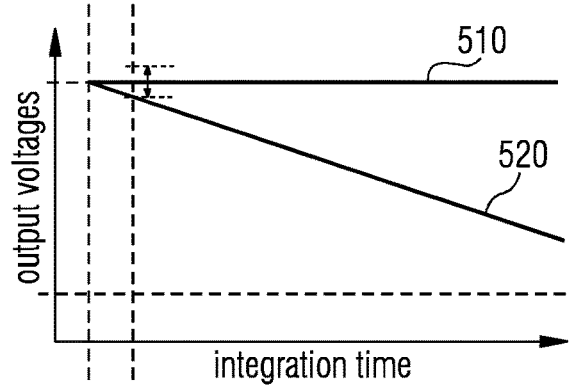

FIG. 5C shows what may happen if the compensation current is too high. In this case signal 510, or the Read-A terminal of the ToF pixel may remain at its reset level and the information may be corrupted. This may, in other words, represent a contrary case to FIG. 5A, where charge integration may occur too fast, or over a too short time interval. In FIG. 5C, charge integration may rather happen too slowly to result in a potential drop of signal 510. In a certain sense the reset level and the saturation case may be seen as a higher and a lower extreme cases, respectively, for values of the signals 510; 520.

Figure 5D:
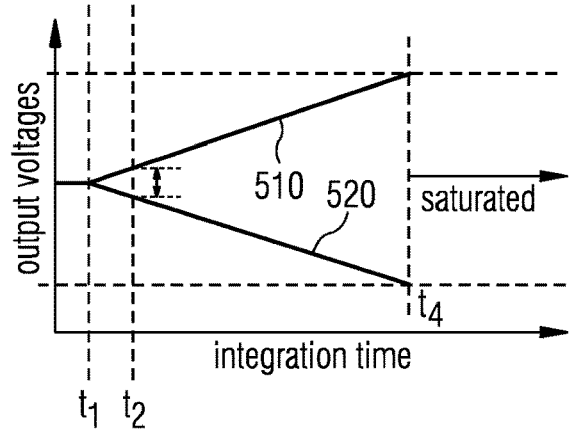

In FIG. 5D the reset voltage of the pixel has been adjusted such that also a higher compensation current leads to a valid pixel output. In other words, even if charge accumulation at terminal Read-A occurs too slowly for a drop of its potential, a slight increase of said potential may still permit correct evaluation of the differential signal until a given point-in-time $t_4>t_2$, where either saturation, for example, of terminal Read-B, or a transition of terminal Read-A into reset mode occurs. As mentioned before, the reset potential may be for example in a range between 0.3 $V_{DDA}$ to 0.7 $V_{DDA}$, or ideally 0.5 $V_{DDA}$, wherein $V_{DDA}$ denotes a supply voltage of the first and second ToF pixels.

Figure 6:
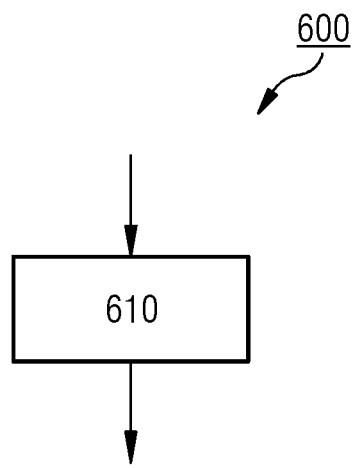
FIG. 6 illustrates a high-level flowchart of a method according to an example.

To summarize, examples also provide a method 600 for capturing imaging data via a pixel array 110, 310. A high-level flowchart of method 600 is shown in FIG. 6. The pixel array 110, 310 comprises a first pixel 120-1, 320-1 comprising a first radiation-sensitive region and at least one associated charge storage region for collecting electrical charges from the first radiation-sensitive region and comprises a second pixel 120-2, 320-2 comprising a second radiation-sensitive region and at least one associated charge storage region for collecting electrical charges from the second radiation-sensitive region.

Method 600 includes generating 610 a common compensation signal 160, 360 being common to the first and second pixels, wherein the common compensation signal mitigates a saturation of the respective charge storage regions of the first and second pixels.

Examples may significantly reduce efforts for example in hardware, building space, or production. Pixel modifications may be avoided, and in some examples only a control voltage for the reset transistor may need to be controlled. Any impact on a fill factor may possibly be excluded, and risks may be reduced by deactivation of the function. Furthermore, a matching of transistors may be helpful, but may also be omitted in some cases. A pixel-to-pixel mismatch may not be relevant. In some examples, current setting may provide a sufficiently good guess. In-pixel mismatch, possibly resulting in gain error, may be compensated by 4-phase measurement in some examples.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and examples of the disclosure, as well as specific examples thereof, are intended to encompass equivalents thereof.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

What is claimed is:

1. An imaging apparatus, comprising:
a pixel array comprising:
a first differential pixel comprising a first radiation-sensitive region and at least one first associated charge storage region for collecting electrical charges from the first radiation-sensitive region, and
a second differential pixel comprising a second radiation-sensitive region and at least one second associated charge storage region for collecting electrical charges from the second radiation-sensitive region; and
a control circuitry configured to:
generate a common compensation signal that is common to the first differential pixel and the second differential pixel,
the common compensation signal to mitigate a saturation of at least one of:
the at least one first associated charge storage region, or
the at least one second associated charge storage region, and
the control circuitry being configured for an open-loop control of the common compensation signal based on a saturation of one or more pixels of the pixel array.

2. The imaging apparatus of claim 1, wherein the control circuitry is further configured to:
generate a common electrical current to or from the at least one first associated charge storage region and the at least one second associated charge storage region.

3. The imaging apparatus of claim 1, wherein the control circuitry is a first control circuitry;
wherein the common compensation signal is a first common compensation signal; and
wherein the imaging apparatus comprises a second control circuitry,
the second control circuitry comprising a closed feedback loop to control a second common compensation signal.

4. The imaging apparatus of claim 1, further comprising:
a reference pixel comprising:
a third radiation-sensitive region,
at least one third associated charge storage region, and
a compensation circuitry configured to generate a reference compensation signal based on an electrical charge in the at least one third associated charge storage region or a quantity derived from the electrical charge,
the reference compensation signal to mitigate a saturation of the at least one third associated charge storage region; and
wherein the control circuitry comprises distribution circuitry configured to distribute the reference compensation signal to the first differential pixel and the second differential pixel.

5. The imaging apparatus of claim 1, wherein the first radiation-sensitive region is located between two charge storage regions of the at least one first associated charge storage region,
wherein the second radiation-sensitive region is located between two charge storage regions of the at least one second associated charge storage region, and
wherein the first differential pixel and the second differential pixel each comprise at least two modulation gates for generating a varying course of electric potential.

6. The imaging apparatus of claim 1, wherein the first differential pixel or the second differential pixel is a Time-of-Flight (ToF) pixel.

7. The imaging apparatus of claim 1, wherein the control circuitry further comprises:
a temperature sensor configured to trigger the common compensation signal if a background temperature exceeds a predefined threshold.

8. The imaging apparatus of claim 1, wherein the control circuitry further comprises:
a light sensor configured to trigger the common compensation signal if a background illumination exceeds a predefined threshold.

9. The imaging apparatus of claim 1, wherein the control circuitry further comprises:
a light sensor configured to trigger an increase in a signal strength of the common compensation signal in relation to a background illumination.

10. The imaging apparatus of claim 1, wherein the first differential pixel or the second differential pixel comprises at least one reset transistor coupled between the at least one first associated charge storage region or the at least one second associated charge storage region and a reset potential and
wherein the control circuitry is further configured to:
provide the common compensation signal to the at least one first associated charge storage region or the at least one second associated charge storage region via the at least one reset transistor of the first differential pixel or the second differential pixel.

11. The imaging apparatus of claim 10, wherein the reset potential is in a range between 0.3 VDDA to 0.7 VDDA, and
wherein VDDA denotes a supply voltage of the first differential pixel or the second differential pixel.

12. The imaging apparatus of claim 10, wherein the control circuitry is further configured to:
provide the common compensation signal and a reset signal for the at least one reset transistor via a common signal line.

13. The imaging apparatus of claim 10, wherein the common compensation signal provided to the at least one reset transistor causes an equal electrical compensation current that is common to the first differential pixel and the second differential pixel to or from the at least one first associated charge storage region and the at least one second associated charge storage region.

14. The imaging apparatus of claim 10, wherein the control circuitry is further configured to:
apply the common compensation signal to a control terminal of the at least one reset transistor.

15. The imaging apparatus of claim 14, wherein the control circuitry is further configured to:
apply the common compensation signal to the control terminal between subsequent predefined reset signals.

16. A Time of Flight (ToF) imaging apparatus, comprising:
a ToF pixel array comprising:
a first differential pixel comprising:
a first light-sensitive semiconductor region, and
at least one first associated charge storage region for collecting electrical charges from the first light-sensitive semiconductor region and at least a first reset transistor coupled between the at least one first associated charge storage region and a reset potential;
a second differential pixel comprising:
a second light-sensitive semiconductor region, and at least one second associated charge storage region for collecting electrical charges from the second light-sensitive semiconductor region and at least a second reset transistor coupled between the at least one second associated charge storage region and the reset potential; and a control circuitry configured to:
generate a common compensation signal that is common to the first differential pixel and the second differential pixel,
the common compensation signal to mitigate a saturation of at least one of:
the at least one first associated charge storage region, or
the at least one second associated charge storage region,
the control circuitry being configured to provide the common compensation signal to the first light-sensitive semiconductor region and the second light-sensitive semiconductor region via the at least the first reset transistor and the at least the second reset transistor, and
the control circuitry being configured for an open-loop control of the common compensation signal based on a saturation of one or more pixels of the ToF pixel array.

17. The ToF imaging apparatus of claim 16, wherein the control circuitry further comprises:
a temperature sensor configured to trigger the common compensation signal if a background temperature exceeds a predefined threshold.

18. The ToF imaging apparatus of claim 16, wherein the control circuitry further comprises:
a light sensor configured to trigger the common compensation signal if a background illumination exceeds a predefined threshold.

19. A method comprising:
collecting, by an imaging apparatus via at least one first associated charge storage region of a first differential pixel of a pixel array, electrical charges from a first radiation-sensitive region of the first differential pixel;
collecting, by the imaging apparatus via at least one second associated charge storage region of a second differential pixel of the pixel array, electrical charges from a second radiation-sensitive region of the second differential pixel; and
generating, by the imaging apparatus, a common compensation signal that is common to the first differential pixel and the second differential pixel,
the common compensation signal to mitigate a saturation of at least one of:
the at least one first associated charge storage region, or
the at least one second associated charge storage region, and
the common compensation signal being controlled via an open-loop control based on a saturation of one or more pixels of the pixel array.

20. The method of claim 19, further comprising:
generating a reference compensation signal based on an electrical charge in at least one third associated charge storage region of a reference pixel or a quantity derived from the electrical charge,
the reference compensation signal to mitigate a saturation of the at least one third associated charge storage region; and
distributing the reference compensation signal to the first differential pixel and the second differential pixel.

* * * * *